United States Patent [19]

Dauvergne

[11] 4,254,623

[45] Mar. 10, 1981

[54] HYDRAULIC CONTROL SYSTEM FOR BRAKE DEVICE

[75] Inventor: Jean L. R. Dauvergne, Survilliers, France

[73] Assignee: Societe Anonyme Francaise du Ferodo, Paris, France

[21] Appl. No.: 936,900

[22] Filed: Aug. 25, 1978

[30] Foreign Application Priority Data

Sep. 9, 1977 [FR] France .............................. 77 27350

[51] Int. Cl.³ ............................................ B60T 13/12
[52] U.S. Cl. ...................................... 60/548; 60/556; 60/581
[58] Field of Search ................ 60/548, 555, 556, 557, 60/562, 577, 581, 547 R

[56] References Cited

U.S. PATENT DOCUMENTS

| 2,587,023 | 2/1952 | Allyn | 60/577 |
| 2,799,140 | 7/1957 | Osborne | 60/555 |
| 3,874,745 | 4/1975 | Peruglia | 60/547 R |
| 4,072,011 | 2/1978 | Ewald | 60/562 |
| 4,114,376 | 9/1978 | Cattanco | 60/562 |
| 4,123,908 | 11/1978 | Bertone | 60/562 |

FOREIGN PATENT DOCUMENTS

| 2359307 | 6/1974 | Fed. Rep. of Germany | 60/562 |
| 2624088 | 12/1976 | Fed. Rep. of Germany | 60/562 |
| 2286033 | 9/1975 | France . | |

Primary Examiner—Abraham Hershkovitz
Attorney, Agent, or Firm—Young & Thompson

[57] ABSTRACT

A hydraulic control system for a brake device comprises independent first and second brake circuits, the first circuit communicating with a first chamber pressurized by movement of a master piston actuated by a brake pedal, and the second circuit communicating with a second chamber whose pressure is dependent on that of the first and is developed by an assistance circuit, the second chamber being separated from the assistance circuit by a piston.

6 Claims, 2 Drawing Figures

HYDRAULIC CONTROL SYSTEM FOR BRAKE DEVICE

BACKGROUND OF THE INVENTION

The present invention relates to a hydraulic control system, particularly for an automobile vehicle brake device, comprising independent first and second brake circuits, and having a master cylinder including a first chamber in communication with the first brake circuit and whose pressure is controlled by movement of a master piston under the action of a brake pedal, while the second brake circuit is in communication with a second chamber whose pressure is dependent on that of the first chamber and is developed by a source of assisting hydraulic pressure under the control of a valve adjusted by the pressure of the first chamber.

The source of assisting hydraulic pressure is for example a positive displacement pump, and in this case the valve is in the form of a relief valve. The hydraulic pressure source may also be of the constant pressure type, and the valve is then in the form of a distributor.

A control system of the type indicated above combines the advantage of safety provided by the two independent circuits with that of easy, sensitive operation, because the master piston acts on one of the circuits and the assistance on the other.

In known systems of this general kind, the second chamber connected to the second circuit is in direct communication with the source of assisting hydraulic pressure. If the assistance should fail, for example because its pressure source is out of action, the second circuit will itself be out of action, and braking will be possible only by means of the first circuit under the action of the master piston.

The present invention has as its object to provide a hydraulic control system, particularly for an automobile vehicle brake device, in which failure of the assistance does not thereby entail the failure of the second circuit.

SUMMARY

According to the invention there is provided a hydraulic control system, particularly for a brake device, which system comprises independent first and second brake circuits, and has a master cylinder including a first chamber in communication with the first brake circuit and whose pressure is controlled by movement of a control master piston under the action of a brake pedal, while the second brake circuit is in communication with a second chamber whose pressure is dependent on that of the first chamber and is developed by a source of assisting hydraulic pressure under the control of a valve adjusted by the pressure of the first chamber, wherein a movable pressure transmitting separator is interposed between the second chamber and the assisting hydraulic pressure source.

DESCRIPTION OF THE PREFERRED EMBODIMENTS

Figure 1:
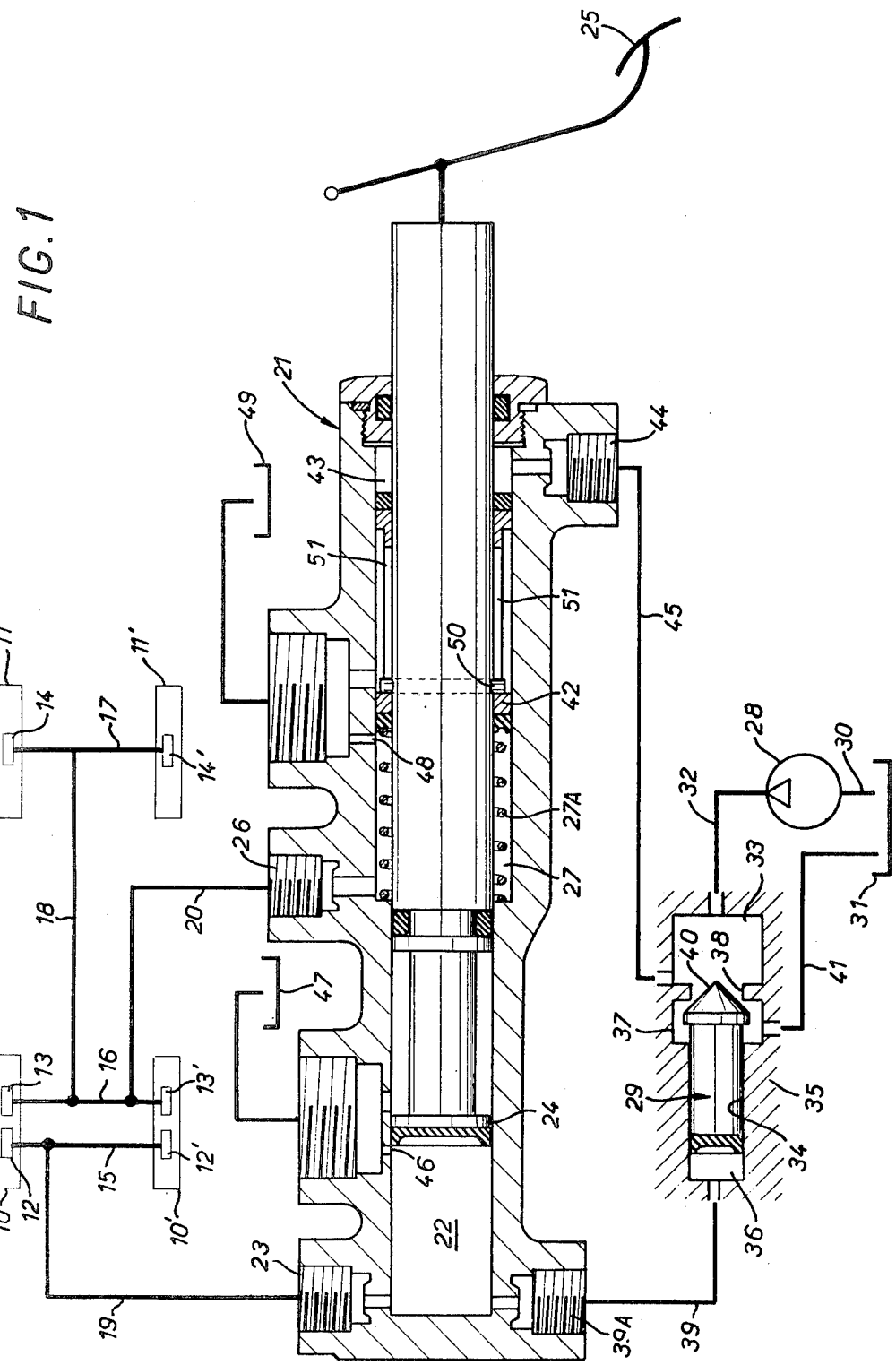
FIG. 1 is a view of a control system according to the invention.

In the embodiment illustrated in FIG. 1, which relates, by way of example only, to an application of the invention to the braking of an automobile vehicle, the front wheels of the automobile vehicle can be seen at 10 and 10' in FIG. 1, while the rear wheels can be seen at 11 and 11'. The right-hand front wheel 10 has two wheel cylinders 12 and 13 for applying the right-hand front brake. The left-hand front wheel 10' has two wheel cylinders 12' and 13' for applying the left-hand front brake. The right-hand rear wheel 11 has a wheel cylinder 14 for applying the right-hand rear brake. The left-hand rear wheel 11' has a wheel cylinder 14' for applying the left-hand rear brake.

The wheel cylinders 12 and 12' are connected to one another by a pipe 15. The wheel cylinders 13, 13', 14, and 14' are connected to one another by a system of pipes 16, 17, and 18. The wheel cylinders 12 and 12' are supplied through a pipe 19 branching from the pipe 15. The wheel cylinders 13, 13', 14, and 14' are supplied through a pipe 20 branching from the pipe 16.

The automobile vehicle thus has two independent brake circuits: a first circuit 15, 19 for supplying the wheel cylinders 12 and 12', and a second circuit 16, 17, 18, 20 for supplying the wheel cylinders 13, 13', 14, and 14'.

The hydraulic control system comprises a master cylinder 21 having a first chamber 22 which communicates via a connection 23 with the first brake circuit 19, 15. The pressure of the chamber 22 is controlled by movement of a control master piston 24 in the master cylinder 21 under the action of a brake pedal 25.

The second brake circuit 20, 16, 17, 18 communicates via a connection 26 with a second chamber 27, which in the example illustrated, is annular and is arranged in the master cylinder 21, around the master piston 24. The second chamber 27 is disposed between the first chamber 22 and the pedal 25.

The pressure of the second chamber 27 is dependent on that of the first chamber 22 in such a manner as to be constantly equal or proportional thereto. For this purpose the pressure of the second chamber 27 is developed by a source 28 of assisting hydraulic pressure under the control of a valve 29. In the example illustrated the latter consists of a relief valve 29 adjusted by the pressure of the first chamber 22.

More particularly, the source of assisting hydraulic pressure consists of a positive displacement pump 28 having a suction pipe 30 drawing from a tank 31 and a delivery pipe 32 connected to a chamber 33 adjacent the valve 29.

The valve 29 consists of a plunger mounted for sliding in a cylindrical bore 34 in a body 35. The cylindrical bore 34 is provided at the rear with an adjusting chamber 36 and at the front it leads into a widened cavity 37. The latter is in communication with the chamber 33 by way of a circular opening 38 forming a valve seat.

The adjusting chamber 36 is connected by a pipe 39 to the first chamber 22 by way of a connection 39A. The valve 29 has at the front a needle-shaped end 40 which can cooperate with the seat 38. The cavity 37 is connected to the tank 31 by means of a pipe 41.

In this way the liquid delivered by the pump 28 and passing through the pipe 32 is placed under pressure in the chamber 33, with a pressure value which is dependent on the pressure of the adjusting chamber 36, that is to say the pressure of the first chamber 22.

In the example illustrated in FIG. 1 the section of the needle-shaped end 40 on the seat 38 is equal to the section of the cylindrical bore 34. Consequently the pressure in the chamber 33 is kept equal to the pressure of the chamber 22. If the section of the end 40 on the seat 38 is different from that of the cylindrical bore 34, in this case the pressure of the chamber 33 is proportional to that of the first chamber 22.

In the example illustrated in FIG. 1 the second chamber 27 is defined at the rear by a movable pressure transmitting separator 42 interposed between the said second chamber 27 and the assisting hydraulic pressure chamber 33.

More particularly, this movable separator is a piston 42 which is coaxial with the master piston 24. The piston 42 is annular and surrounds the master piston 24. The piston 42 cooperates with a return spring 27A, which may optionally be dispensed with.

Behind the piston 42 the master cylinder 21 has a chamber 43 provided with a connection 44 which is connected to the chamber 33 by a pipe 45. In the course of braking, the liquid delivered by the pump 28 is thus divided between this chamber 43 and the tank 31.

It will be appreciated that the piston 42 keeps the pressure in the enclosure 33, 45 and 43 equal to that in the second chamber 27.

A replenishment aperture 46 of usual construction, which is connected to a tank 47, cooperates with the master piston 24. In the same manner the separator piston 42 is associated with an aperture 48 connected to a tank 49.

The piston 42 is adapted to be pushed by the master piston 24 with the aid of a safety thrust means 50. The latter consists, for example, of a pin fixed to the master piston 24 and engaged in apertures 51 in the piston 42 in such a manner as to be able to move relative to the latter.

As long as the driver does not depress the pedal 25 the control occupies the position shown in FIG. 1, in which the wheel cylinders 12, 12' are in communication with the tank 47 by way of 19, 22, and 46, while the wheel cylinders 13, 13', 14, 14' are in communication with the tank 49 via 20, 27, and 48.

When the driver depresses the pedal 25, the master piston 24 clears the aperture 46 and isolates the first chamber 22 from the tank 47. The chamber 22 thus isolated reduces in volume by an amount in proportion to the displacement of the master piston 24. The pressure rises in the enclosure 22, 19, 15, 12, 12', which both operates the wheel cylinders 12, 12', and pushes the valve 29 towards the right in FIG. 1.

The pressure developed in the chamber 33 by the positive displacement assisting pump 28 tends to rise, while being kept equal to the pressure in the chamber 36. This pressure is also developed in the chamber 43, pushing the piston 42 to the left in FIG. 1. The latter closes the opening 48 and causes a rise in pressure in the enclosure 27, 20, 16, 17, 18, 13, 13', 14, 14'.

Easy control is thus obtained because of the assistance of the pump 28, and control is also sensitive because part of the braking is effected direct by the force on the pedal 25. This control moreover affords excellent safety.

If any of the three circuits is defective, that is to say the first circuit 22, 19, 15, 12, 12', 39, 36 the second circuit 27, 20, 16, 17, 18, 13, 13', 14, 14', or the assistance circuit 28, 32, 33, 45, 43, alternative means of braking is still available.

If the first circuit 22, 19, 15, 12, 12', 39, 36 is defective, for example because of a burst, the pump 28 will operate without load and the pressure will become negligible in the chamber 43. However, the depression of the pedal 25 will, because the master piston 24 abuts at 50 against the piston 42, have the effect of placing the chamber 27 under pressure and thus of effecting braking by means of the second circuit containing the wheel cylinders 13, 13', 14, 14'.

If it is the second circuit 27, 20, 16, 17, 18, 13, 13', 14, 14' that is defective, for example because of a burst, the wheel cylinders 13, 13', 14, 14' will effect no further braking. However, the depression of the pedal 25 will have the effect of placing the chamber 22 under pressure directly by means of the piston 24, and thus of effecting braking by the first circuit containing the wheel cylinders 12, 12'.

If it is the assistance circuit 28, 32, 33 45, 43 that fails, for example through a burst at 32, 45 or through the failure of the pump 28, both the first and the second brake circuits will remain intact. Action on the master piston 24 has full effect not only on the first brake circuit 18, 12, 12', 14, 14', but also on the second brake circuit 20, 13, 13' through the thrust on the separator piston 42 under the action of the abutment pin 50 of the master piston 24.

As a modification (FIG. 2) the arrangement is similar to that just described with reference to FIG. 1, and the reference numerals used for FIG. 1 have been used again in FIG. 2 to designate similar elements.

Figure 2:
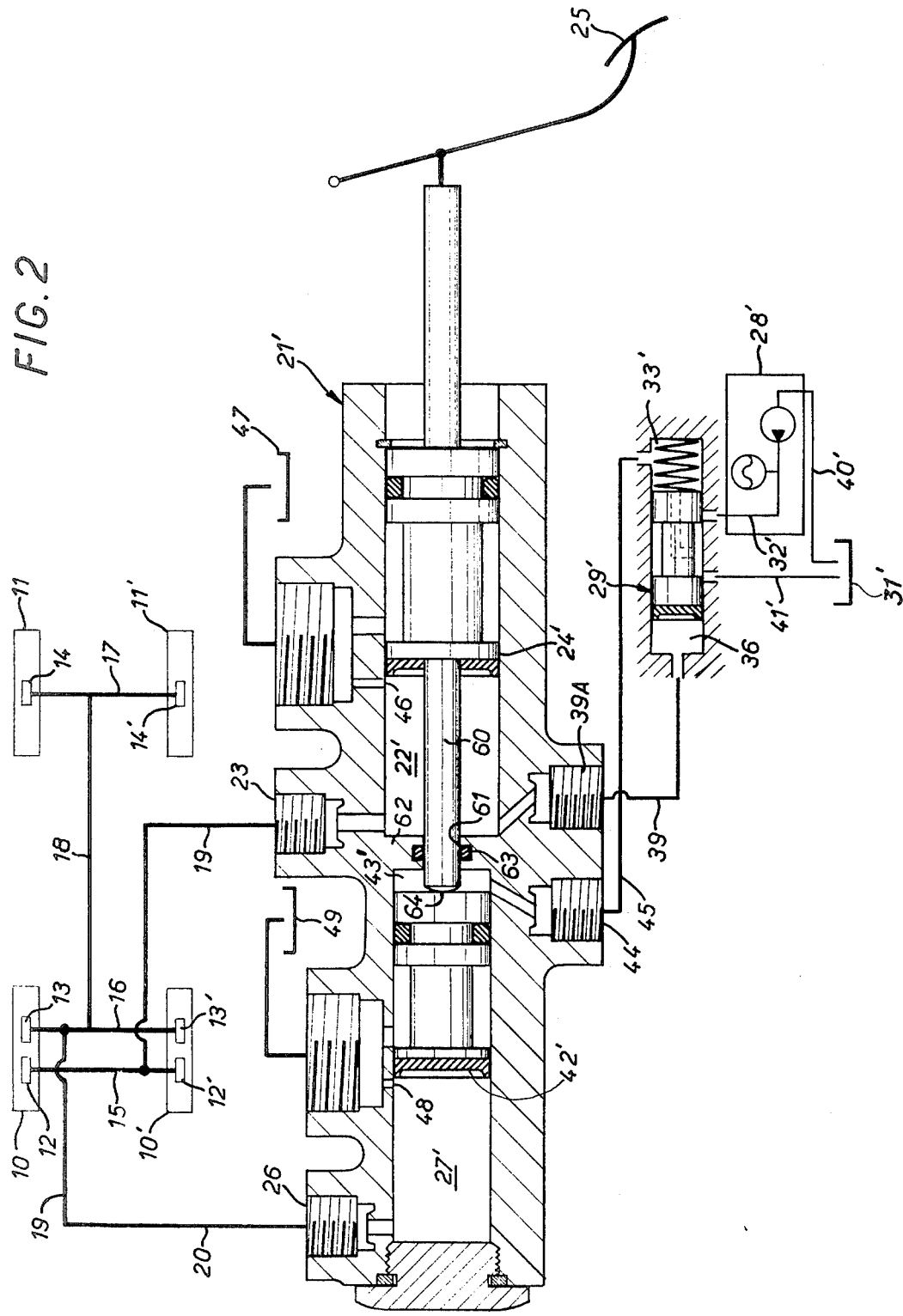
FIG. 2 is a view of a modified control system according to the invention.

However, in FIG. 2, the second chamber 27' is situated in the master cylinder 21', at the opposite end of the latter to the pedal 25. The separator piston 42' is not annular but solid and occupies the entire circular section of the chamber 17.

As previously, the master piston 24 is adapted to push the separator piston 42' by means of an abutment which, as in the case of pin 50, and FIG. 1, comprises safety thrust means; but here this abutment means consists of a rod 60 which is fastened to the master piston 24. The rod 60 passes through an opening 61 provided in a partition 62 in the master cylinder 21', this partition separating the chambers 43' and 22'. A seal 63 is accommodated in the opening 61 to ensure tightness. The end 64 of the rod 60 is adapted to abut the piston 42'.

In addition, in FIG. 2 the pressure source designated 28' is not a positive displacement pump but is of the constant pressure type. In this case the valve designated 29' is not a needle relief valve, but a distributor adjusted at 36 by the pressure of the first chamber 22'. Either the pressure pipe 32' of the source 28' or the return pipe 41' leading to the tank 31' is brought into communication with the pipe 45 under the action of the pressure in 36 competing with the pressure in portion 33' of the pipe 45.

The functioning of the control system shown in FIG. 2 is similar to that described with reference to FIG. 1.

Obviously, a positive displacement pump could be provided in FIG. 2, and a constant pressure source 28' could be provided in FIG. 1.

I claim:

1. A hydraulic control system for a brake device, said system comprising independent first and second brake circuits, a brake pedal, a source of assisting hydraulic pressure, a master cylinder having a master piston defining a first chamber, said master piston being actuated by said brake pedal and being insensitive to said assisting hydraulic pressure, said first chamber being in communication with said first brake circuit, a second chamber in communication with said second brake circuit, a third chamber fed by said assisting hydraulic pressure through a valve controlled by the first chamber pressure in such manner that said assisting hydraulic pressure varies as said first chamber pressure, a movable pressure transmitting separator interposed between said second and third chambers in such manner that pressure in said third chamber can be transmitted to said second chamber, and safety thrust means operable between said master piston and said separator in such manner that actuation of said piston can actuate said separator to increase the pressure in said second chamber.

2. A hydraulic control system according to claim 1 wherein said first chamber, said master piston, said second chamber, said separator and said third chamber are axially successively arranged in said master cylinder.

3. A hydraulic control system according to claim 2, wherein said separator is a sleeve surrounding said master piston, has aperture means and said safety thrust means comprise pin means rigid with said master piston and engaged in said aperture means for limited relative movement between said pin means and said sleeve.

4. A hydraulic control system according to claim 1, wherein said valve is controlled by said first chamber pressure in such manner that said assisting hydraulic pressure and said first chamber pressure are substantially equal.

5. A hydraulic control system according to claim 1, wherein said second chamber, said separator, said third chamber, a fixed wall, said first chamber and said master piston are axially successively arranged in said master cylinder.

6. A hydraulic control system according to claim 5, further comprising safety thrust means operable between said master piston and said separator, wherein said separator is a piston engaged in said master cylinder and said safety thrust means comprise rod means rigid with said master piston and passing through said fixed wall for engaging said separator piston.

* * * * *